(12) United States Patent
Tsuchiya et al.

(10) Patent No.: US 11,545,859 B2
(45) Date of Patent: Jan. 3, 2023

(54) MANUFACTURING METHOD OF STATOR FOR VEHICLE ROTARY ELECTRIC MACHINE

(71) Applicant: TOYOTA JIDOSHA KABUSHIKI KAISHA, Toyota (JP)

(72) Inventors: Yukio Tsuchiya, Toyota (JP); Akihide Takehara, Toyota (JP); Toshihiro Takei, Toyota (JP); So Akimori, Kazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/242,819

(22) Filed: Apr. 28, 2021

(65) Prior Publication Data

US 2021/0376671 A1    Dec. 2, 2021

(30) Foreign Application Priority Data

May 28, 2020  (JP) .............................. JP2020-093789

(51) Int. Cl.
    *H02K 1/16*    (2006.01)
    *H02K 3/48*    (2006.01)
    *H02K 3/34*    (2006.01)

(52) U.S. Cl.
    CPC ............. *H02K 1/165* (2013.01); *H02K 3/345* (2013.01); *H02K 3/48* (2013.01)

(58) Field of Classification Search
    CPC ............ H02K 1/16; H02K 1/165; H02K 3/34; H02K 3/345; H02K 3/48

USPC .................................. 310/208, 215, 216.105
See application file for complete search history.

(56) References Cited

U.S. PATENT DOCUMENTS

| | | | |
|---|---|---|---|
| 2012/0293037 A1* | 11/2012 | Uchida .................. | H02K 3/487 310/214 |
| 2014/0225465 A1* | 8/2014 | Goto ........................ | H02K 3/12 310/71 |
| 2018/0083496 A1* | 3/2018 | Honjo ...................... | H02K 1/04 |
| 2018/0254673 A1 | 9/2018 | Koizumi et al. | |
| 2021/0234439 A1* | 7/2021 | Koga .................... | H02K 15/085 |
| 2021/0344243 A1* | 11/2021 | Koga .................... | H02K 15/064 |
| 2021/0359579 A1* | 11/2021 | Fukuda .................... | H02K 3/38 |
| 2021/0384787 A1* | 12/2021 | Okamoto ............. | H02K 15/024 |

FOREIGN PATENT DOCUMENTS

| | | |
|---|---|---|
| JP | 2019-135892 A | 8/2019 |
| WO | WO 2017/047247 A1 | 3/2017 |

* cited by examiner

*Primary Examiner* — Rashad H Johnson
(74) *Attorney, Agent, or Firm* — Oblon, McClelland, Maier & Neustadt, L.L.P.

(57) ABSTRACT

A step of inserting an insulating paper into a slot of a stator core (second step) is performed, a step of placing a jig at a position that is on a side opposite to a side from which a segment coil is inserted into the slot of the stator core and that overlaps with a protrusion when viewed in an inserting direction of the segment coil (third step) is performed, and then a step of inserting the segment coil into the slot (fourth step) is performed. Therefore, even when the insulating paper is dragged by the segment coil in the process of inserting the segment coil into the slot, the insulating paper abuts the jig and the movement of the insulating paper is restricted, thereby suppressing displacement of the insulating paper from the slot.

2 Claims, 10 Drawing Sheets

MANUFACTURING METHOD OF STATOR FOR VEHICLE ROTARY ELECTRIC MACHINE

CROSS-REFERENCE TO RELATED APPLICATION

This application claims priority to Japanese Patent Application No. 2020-093789 filed on May 28, 2020, incorporated herein by reference in its entirety.

BACKGROUND

1. Technical Field

The present disclosure relates to a manufacturing method of a stator that constitutes a vehicle rotary electric machine.

2. Description of Related Art

A stator constituting a vehicle rotary electric machine includes an annular stator core and a lead wire housed in a slot that is a space provided in an inner peripheral portion of the stator core. Further, an insulating paper is interposed between the stator core and the lead wire. A stator described in Japanese Unexamined Patent Application Publication No. 2019-135892 (JP 2019-135892 A) is the stator described above. JP 2019-135892 A describes the stator including a pair of stopper groove portions, each of which includes a stopper groove. The stopper grooves are provided on wall surfaces that face each other and on which a slot is provided, and can stop end portions of the insulating paper so as to suppress displacement of the insulating paper in the slot.

SUMMARY

The stopper groove portions described in JP 2019-135892 A are provided on an inner peripheral side in the slot in a radial direction of the stator core. Therefore, there is a concern that the number of lead wires disposed in the slot is reduced corresponding the area where the stopper groove portions are provided.

The present disclosure has been made taken into consideration the above circumstances as the background, and an object of the present disclosure is to provide a manufacturing method of a stator core constituting a vehicle rotary electric machine and having a configuration in which displacement of the insulating paper interposed between the stator core and lead wires housed in a slot provided on the stator core is suppressed and reduction of the number of lead wires housed in the slot is suppressed at the same time.

The gist of a first aspect of the present disclosure is a (a) a manufacturing method of a stator for a vehicle rotary electric machine, the stator including an annular stator core, a slot that is a groove hole provided in an inner peripheral portion of the stator core and penetrates the stator core, and an insulating paper that is interposed between a wall surface of the slot and a lead wire housed in the slot and is disposed to surround the lead wire, a protrusion protruding toward an inner peripheral side of the stator core being provided for the insulating paper on a radially inner side of the stator core, the manufacturing method including (b) inserting the insulating paper into the slot of the stator core, and (c) placing a jig at a position that is on a side opposite to a side from which the lead wire is inserted into the slot of the stator core and that overlaps with the protrusion when viewed in an inserting direction of the lead wire into the slot of the stator core and inserting the lead wire into the slot.

The gist of a second aspect of the present disclosure is that, in the manufacturing method of the stator according to the first aspect, one end and the other end of the insulating paper surrounding the lead wire are disposed at positions different from a position on the radially inner side of the stator core.

The gist of a third aspect of the present disclosure is that, in the manufacturing method of the stator according to the first aspect or the second aspect, a space surrounded by the protrusion and the lead wire is provided between the protrusion and the lead wire.

According to the manufacturing method of the stator of the first aspect, a first step of inserting the insulating paper into the slot of the stator core is performed, and the step of placing the jig at the position that is on the side opposite to the side from which the lead wire is inserted into the slot of the stator core and overlaps the protrusion when the stator core is viewed in the inserting direction of the lead wire and inserting the lead wire into the slot is performed. Even when the insulating paper is dragged by the lead wire in the process of inserting the lead wire into the slot, the insulating paper abuts the jig and movement of the insulating paper is restricted, thereby suppressing displacement of the insulating paper from the slot. Further, a stopper groove portion to suppress displacement of the insulating paper does not need to be provided in the slot. Therefore, reduction of the number of the lead wires housed in the slot is also suppressed.

According to the manufacturing method of the stator of the second aspect, the one end and the other end of the insulating paper surrounding the lead wire are disposed at positions different from the positions on the radially inner side of the stator core. Therefore, rigidity of the protrusion provided for the insulating paper is secured. Therefore, when the protrusion comes into contact with the jig in the process of inserting the lead wire into the slot, deformation of the protrusion caused by the jig can be suppressed.

According to the manufacturing method of the stator of the third aspect, the space is provided between the protrusion and the lead wire. Therefore, a coolant flows in the space provided between the protrusion and the lead wire, thereby improving cooling performance for the stator core and the lead wire.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a first embodiment of the present disclosure will be described in detail with reference to the drawings. Note that, in the following embodiment, the drawings are appropriately simplified or modified, and the dimensional ratios and shapes of the respective parts are not necessarily drawn accurately.

Figure 1:
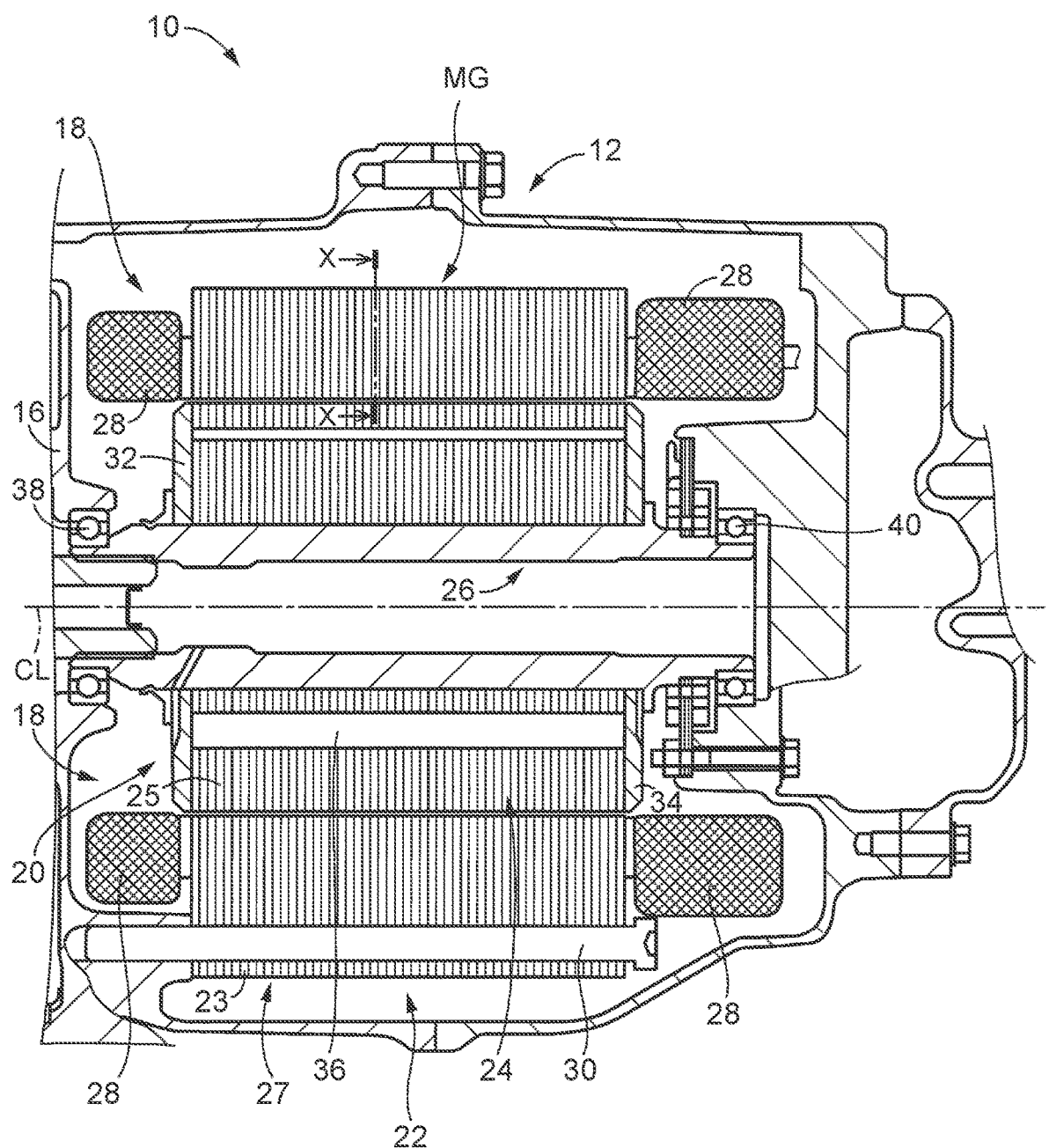
FIG. 1 is a sectional view showing a part of a vehicle drive device provided in a vehicle to which the present disclosure is applied.

FIG. 1 is a sectional view showing a part of a vehicle drive device 10 (hereinafter referred to as a drive device 10) provided in a vehicle to which the present disclosure is applied. The drive device 10 is provided in, for example, an electric vehicle or a hybrid vehicle. The drive device 10 includes a vehicle rotary electric machine MG (hereinafter referred to as a rotary electric machine MG) in a case 12 that is a non-rotating member. The rotary electric machine MG functions as a driving force source of the vehicle.

A motor chamber 18 that is partitioned by a partition wall 16 is defined in the case 12, and the rotary electric machine MG is housed in the motor chamber 18. The rotary electric machine MG is disposed so as to be rotatable about an axis CL.

The rotary electric machine MG includes a stator 22 that is fixed to the case 12 so as not to be rotatable and a rotor 20 that is arranged on an inner peripheral side of the stator 22. The rotor 20 includes an annular rotor core 24 and a rotor shaft 26 integrally connected to an inner circumference of the rotor core 24.

The stator 22 includes an annular stator core 27 and a stator coil 28 attached to the stator core. The stator core 27 is configured by laminating a plurality of electromagnetic steel plates 23 having a disk shape. The stator core 27 is fastened to the case 12 using a plurality of bolts 30 so as not to be rotatable.

The rotor core 24 is disposed on an inner peripheral side of the stator core 27. The rotor core 24 is configured by laminating a plurality of electromagnetic steel plates 25 having a disk shape. A pair of end plates 32, 34 is disposed such that the end plates 32, 34 are provided on respective sides of the rotor core 24 in a direction of the axis CL of the rotor core 24. The rotor core 24 is held so as to be interposed between the end plates 32, 34. The rotor core 24 includes a built-in magnet 36.

The rotor shaft 26 has a cylindrical shape, and is supported so as to be rotatable about the axis CL by bearings 38, 40 that are disposed at respective ends of the rotor shaft 26 in the axial direction (in the direction of the axis CL). The rotor core 24 is integrally fixed to an outer peripheral surface of the rotor shaft 26.

Figure 2:
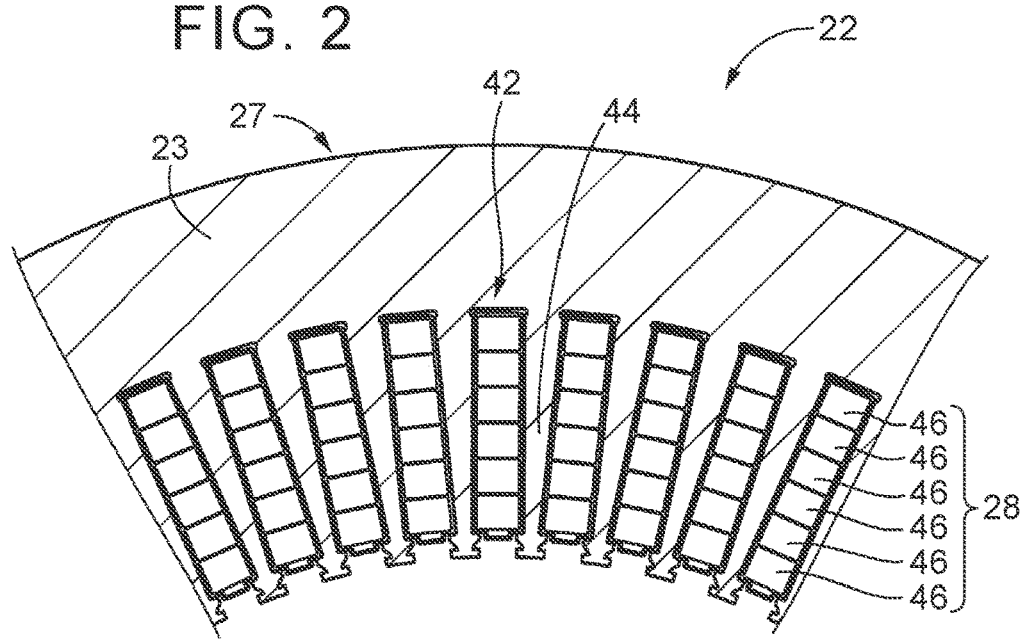
FIG. 2 is a sectional view of a stator shown in FIG. 1 that is taken along a cut line X.

FIG. 2 is a sectional view of the stator 22 shown in FIG. 1 that is taken along a cut line X. Note that, FIG. 2 only shows a part of the stator 22 in a circumferential direction. As shown in FIG. 2, the stator 22 includes the stator core 27 and the stator coil 28. Hereinafter, an inner circumference (inner side) and an outer circumference (outer side) of the stator core 27 correspond to an inner circumference (inner side) and an outer circumference (outer side) in a radial direction centered on the axis CL.

The stator core 27 is configured to have an annular shape by laminating the plurality of electromagnetic steel plates 23 having a disk shape. A plurality of slots 42 is provided in an inner peripheral portion of the stator core 27. Each of the slots 42 is a groove hole provided in the inner peripheral portion of the stator core 27 and extending radially outward from an inner peripheral surface of the stator core 27. The slots 42 are provided radially at equal angular intervals in the circumferential direction of the stator core 27. The slot 42 penetrates the stator core 27 in the direction of the axis CL. In connection with this, a plurality of teeth 44 protruding toward an inner peripheral side are provided. Each tooth 44 is disposed between the slots 42 adjacent to each other in the circumferential direction. A stator coil 28 is wound around each tooth 44. The stator coil 28 is a three-phase coil composed of a U phase, a V phase, and a W phase.

Each slot 42 houses a plurality of (six in the first embodiment) segment coils 46 constituting the stator coil 28. The segment coils 46 housed in each slot 42 are arranged side by side in the slot 42 in the radial direction of the stator core 27. As shown in FIG. 2, the section of each segment coil 46 has a rectangular shape. Each segment coil 46 has a substantially U shape as described later. Further, paired arm portions 46a, 46b (see FIG. 4) constituting the segment coil 46 are inserted into different slots 42, respectively. When the stator 22 is manufactured, the pair of arm portions 46a, 46b constituting the segment coil 46 is inserted in parallel to the axis CL from one side to the other side in the direction of the axis CL of the stator core 27. That is, the direction in which the segment coil 46 is inserted into the slots 42 of the stator core 27 (hereinafter, the inserting direction of the segment coil 46) is parallel to the direction of the axis CL. The segment coil 46 corresponds to the lead wire of the present disclosure.

Figure 3:
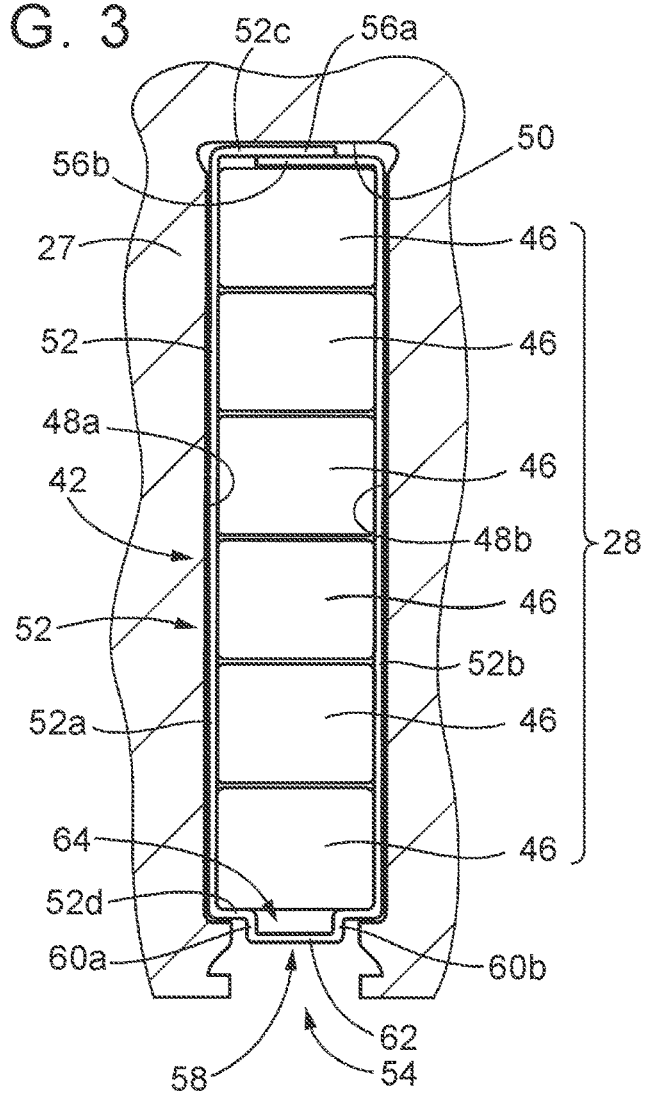
FIG. 3 is an enlarged sectional view of one of slots shown in FIG. 2.

FIG. 3 is an enlarged sectional view of one of the slots 42 shown in FIG. 2. In FIG. 3, a lower portion in the drawing corresponds to the inner peripheral side (radially inner side) of the stator core 27, and an upper portion in the drawing corresponds to the outer peripheral side (radially outer side) of the stator core 27.

The slot 42 is configured of a groove hole extending radially outward from the inner peripheral surface of the stator core 27. The slot 42 is provided, thereby providing an opening 54 with which the inner peripheral surface of the stator core 27 opens. The slot 42 is surrounded by a pair of side walls 48a, 48b disposed substantially in parallel to the radial direction of the stator core 27 and a bottom wall 50 located on the radially outer side of the stator core 27 and connecting the side wall 48a and the side wall 48b. The side walls 48a, 48b are provided such that wall surfaces of the side walls 48a, 48b face each other and are parallel to each other. The bottom wall 50 is the outermost wall in the radial direction of the stator core 27 among the walls constituting the slot 42. The bottom wall 50 connects ends of the side walls 48a, 48b.

The segment coils 46 are arranged in a row in the slot 42 in the radial direction of the stator core 27. Each segment coil 46 is disposed such that a long side of the rectangular section is along the circumferential direction of the stator core 27 and a short side is along the radial direction of the stator core 27.

An insulating paper 52 is interposed between the wall surface of each wall (side walls 48a, 48b, bottom wall 50) defining the slot 42 of the stator core 27 and the segment coils 46 housed in the slot 42. The insulating paper 52 is made of an insulating member having insulating properties, such as aramid paper, a non-woven fabric, or a resin material. As shown in FIG. 3, the insulating paper 52 is appropriately bent such that the insulating paper 52 is disposed so as to surround the segment coils 46 housed in the slot 42 when viewed from the inserting direction of the segment coils 46. Further, the insulating paper 52 has the dimension, in the direction of the axis CL, that is the same or substantially the same as the dimension of the stator core 27 in the direction of the axis CL so as to cover the entire wall (the side walls 48a, 48b, and the bottom wall 50) constituting the slot 42 of the stator core 27.

As shown in FIG. 3, the insulating paper 52 is configured of a first portion 52a, a second portion 52b, a third portion 52c, and a fourth portion 52d. The first portion 52a is interposed between the side wall 48a of the slot 42 and the segment coils 46. The second portion 52b is interposed between the side wall 48b of the slot 42 and the segment coils 46. The third portion 52c is interposed between the bottom wall 50 of the slot 42 and the segment coil 46. The fourth portion 52d is located on a radially inner side of the stator core 27. The first portion 52a and the second portion 52b extend longitudinally along the radial direction of the stator core 27.

One end 56a and the other end 56b of the insulating paper 52 are disposed in the third portion 52c, and overlap with each other. As described above, the one end 56a and the other end 56b of the insulating paper 52 are disposed in the third portion 52c that is located at a different position from a position of the fourth portion 52d of the insulating paper 52, that is, a position on the radially inner side of the stator core 27 (position of the opening 54 of the slot 42).

Further, in the insulating paper 52, the fourth portion 52d located on the radially inner side of the stator core 27 includes a protrusion 58 that protrudes toward the inner peripheral side of the stator core 27. The protrusion 58 has a protruding shape that protrudes toward the inner peripheral side of the stator core 27.

When the protrusion 58 is viewed in the inserting direction of the segment coils 46, the protrusion 58 has a U-shaped section. The protrusion 58 is configured of a pair of protruding portions 60a, 60b protruding toward the inner peripheral side of the stator core 27, and a connecting portion 62 connecting ends of the protruding portions 60a, 60b. The protruding portions 60a, 60b have the same dimensions in the radial direction of the stator core 27. Therefore, the connecting portion 62 is located inward of the segment coil 46 housed in the slot 42 in the radial direction of the stator core 27 by a length of the protruding portions 60a, 60b. In connection with this, a space 64 is provided between the protrusion 58 and the segment coil 46. The space 64 is surrounded by the protruding portions 60a, 60b and the connecting portion 62 of the protrusion 58 and the long side of the segment coil 46. As an oil flows in the space 64, the stator core 27 and the stator coil 28 are effectively cooled by the oil flowing in the space 64.

Figure 4A:
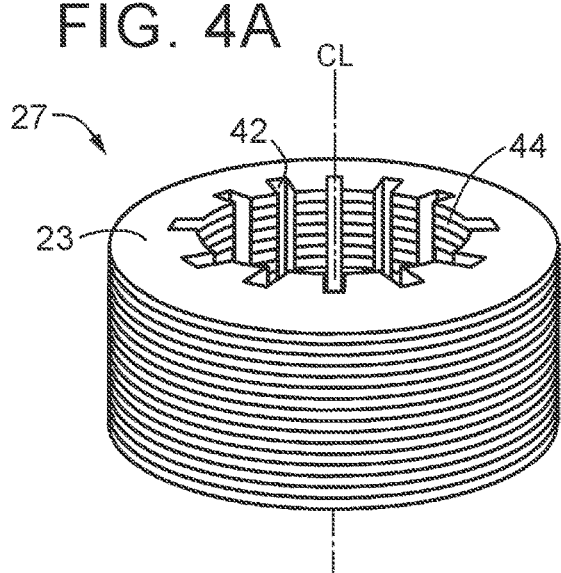
FIGS. 4A to 4D are diagrams for explaining a method of winding a stator coil around a stator core of a vehicle rotary electric machine shown in FIG. 1.
Figure 4B:
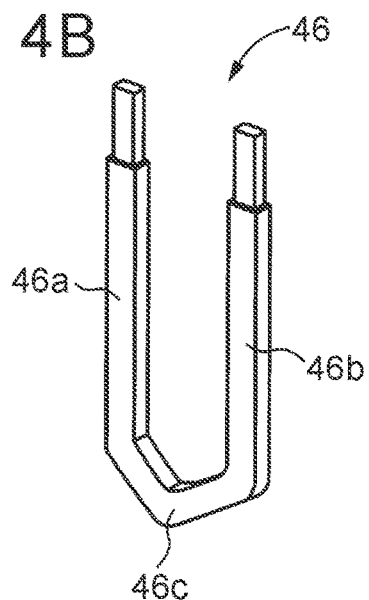
Figure 4C:
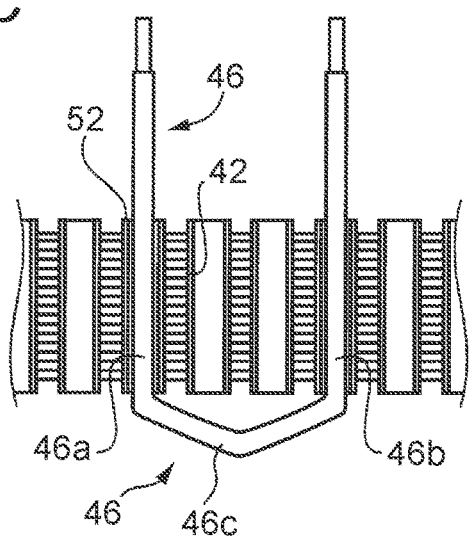
Figure 4D:
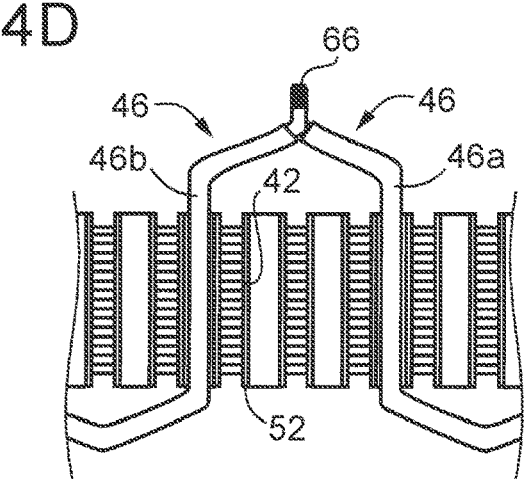

Next, a manufacturing method of the stator 22 will be described. FIGS. 4A to 4D are diagrams for explaining a method of winding the stator coil 28 around the stator core 27 of the vehicle rotary electric machine MG shown in FIG. 1. FIG. 4A is a perspective view of the stator core 27. FIG. 4B is a perspective view showing an overall configuration of the segment coil 46. FIG. 4C is an exploded diagram in the circumferential direction of the stator core 27 showing a state in which the segment coil 46 is inserted into the slot 42 of the stator core 27 as viewed from the inner peripheral side toward the outer peripheral side. FIG. 4D is an exploded diagram in the circumferential direction of the stator core 27 showing a state where the segment coils 46 are joined by welding as viewed from the inner peripheral side toward the outer peripheral side.

As shown in FIG. 4A, the stator core 27 is configured by laminating the electromagnetic steel plates 23 in the direction of the axis CL. The slots 42 are provided in the inner peripheral portion of the stator core 27 at equal angular intervals in the circumferential direction. Further, each tooth 44 is provided between two adjacent slots 42 in the inner peripheral portion of the stator core 27. The shape and the number of the slots 42 shown in FIG. 4A do not always match the actual shape and number.

As shown in FIG. 4B, the segment coil 46 is composed of a so-called flat conductor having a rectangular section in a longitudinal plate shape and an insulating film such as enamel is provided on the surface of the segment coil 46. The segment coil 46 is bent into a substantially U shape. The segment coil 46 includes the first arm portion 46a and the second arm portion 46b extending linearly in the same direction on the left and right sides of the U shape, and a connecting portion 46c that connects a root portion of the first arm portion 46a and a root portion of the second arm portion 46b. The insulation coating has been removed from tip ends of the first arm portion 46a and the second arm portion 46b.

As shown in FIG. 4C, the arm portions 46a, 46b of the segment coil 46 are inserted into the slot 42 with the insulating paper 52 inserted into the slot 42 in advance. With this configuration, the tip ends of the arm portions 46a, 46b of the segment coil 46 protrude from one end of the stator core 27. Further, the insulating paper 52 is interposed between the slot 42 and the arm portions 46a, 46b of the segment coil 46 inserted in the slot 42.

As shown in FIG. 4D, the portions of the arm portions 46a, 46b of the segment coil 46 protruding from the stator core 27 are bent in the circumferential direction of the stator core 27. Further, the tip end of the first arm portion 46a of one of the segment coils 46 and the tip end of the second arm portion 46b of another segment coil 46 are welded to provide a welded portion 66. With the configuration in which the segment coils 46 are electrically connected with each other via the welded portion 66, the stator coil 28 wound around the teeth 44 is provided. Welding is, for example, tungsten inert gas (TIG) welding.

As described above, in the manufacturing step of the stator 22, the arm portions 46a, 46b of the segment coil 46 are inserted into the slot 42. However, if a friction coefficient between the segment coil 46 and the insulating paper 52 is high, the insulating paper 52 may be dragged and moved by the segment coil 46, and the insulating paper 52 may be displaced from the slot 42. In particular, when the insulating paper 52 is coated with an adhesive in advance, the insulating paper 52 is easily dragged by the segment coil 46 in the process of inserting the segment coil 46, and the insulating paper 52 is easily displaced from the slot 42. When the insulating paper 52 is displaced from the slot 42, heat generated from the stator coil 28 is easily transferred to the rotor core 24. As a result, temperatures of the rotor core 24 and the magnet 36 built in the rotor core 24 may increase.

On the other hand, in the process of inserting the arm portions 46a, 46b of the segment coil 46 into the slot 42 in the manufacturing step of the stator 22, a jig 68 is placed in advance at a position that is on a side opposite to a side from which the segment coil 46 is inserted into the slot 42 in the direction of the axis CL of the stator core 27 and overlaps with the protrusion 58 of the insulating paper 52 as viewed from the inserting direction of the segment coil 46, and the segment coil 46 is inserted into the slot 42 in this state. With the processing in which the jig 68 is placed at the position above, when the insulating paper 52 is dragged by the segment coil 46 in the process of inserting the arm portions 46a, 46b of the segment coil 46 into the slot 42 of the stator core 27, the protrusion 58 provided for the insulating paper 52 abuts the jig 68 and movement of the insulating paper 52 is restricted, thereby suppressing displacement of the insulating paper 52.

Figure 5:
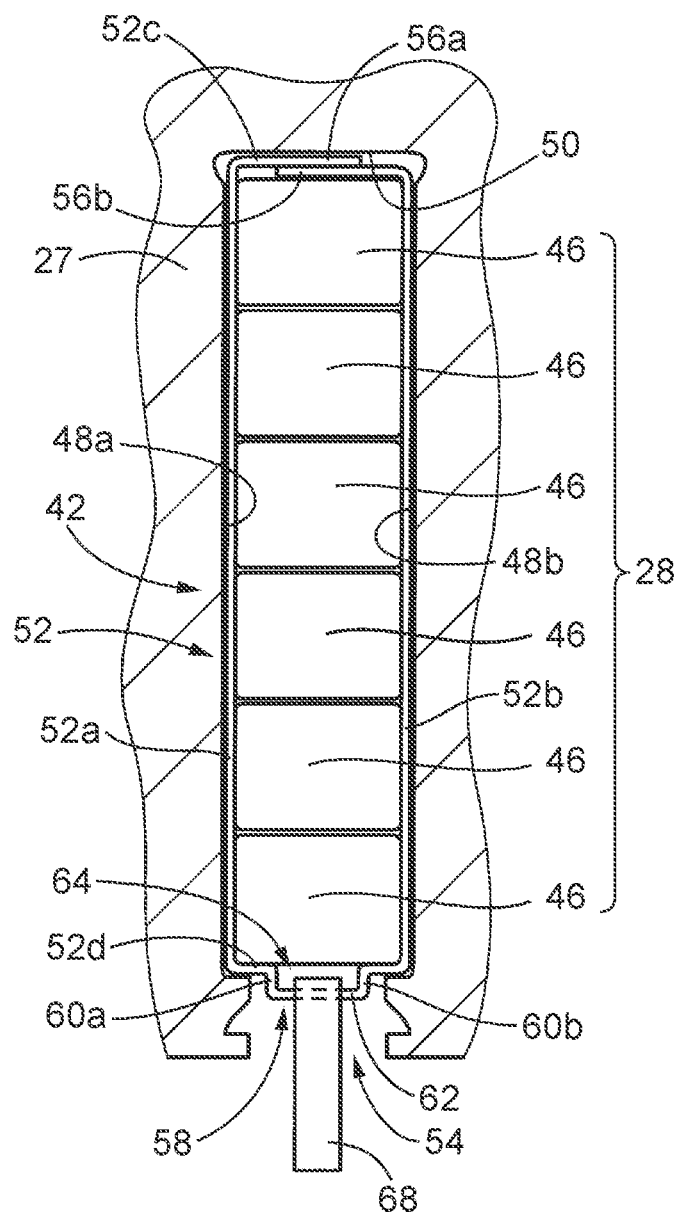
FIG. 5 is a diagram of the stator core viewed from a side opposite to a side from which the segment coil is inserted into the slot in a direction of an axis in the process of inserting each arm portion of the segment coil into the slot of the stator core.

FIG. 5 is a diagram showing the stator core 27 viewed from the side (the lower side in the drawing) opposite to the side from which the segment coil 46 is inserted into the slot 42 in the direction of the axis CL (the upper side in the drawing) in the process of inserting the arm portions 46a, 46b of the segment coil 46 into the slot 42 of the stator core 27 in the manufacturing step of the stator 22. Although one of the slots 42 provided in the stator core 27 is shown in FIG. 5, the jig 68 is also disposed at the same position as the position shown in FIG. 5 for the other slots 42 provided in the stator core 27.

The jig 68 is disposed on the side opposite to the side from which the arm portions 46a, 46b of the segment coil 46 are inserted into the slot 42 of the stator core 27 in the direction of the axis CL of the stator core 27, that is, on a side where the tip ends of the arm portions 46a, 46b of the segment coil 46 protrude from the stator core 27 in a state where the segment coil 46 is inserted into the slot 42.

The jig 68 has a longitudinal shape and is disposed such that the longitudinal direction is along the radial direction of the stator core 27. Specifically, the jig 68 passes through the opening 54 provided in the slot 42 from the inner peripheral side of the stator core 27, and a tip end of the jig 68 extends to a position near the segment coil 46 in the radial direction of the stator core 27. The jig 68 is restricted to a position where the tip end of the jig 68 is located inward of the segment coil 46 in the radial direction of the stator core 27.

Further, the jig 68 is disposed at a position where the tip end of the jig 68 overlaps with the protrusion 58 of the insulating paper 52 when viewed in the inserting direction of the segment coil 46. As shown in FIG. 5, when the stator core 27 is viewed in the inserting direction of the segment coil 46, an outer end portion of the jig 68 in the radial direction of the stator core 27 overlaps with the connecting portion 62 of the insulating paper 52. The jig 68 is disposed at a position adjacent to the insulating paper 52 in the direction of the axis CL of the stator core 27.

With the processing in which the jig 68 is placed at the position above, when the insulating paper 52 is dragged by the segment coil 46 in the process of inserting the segment coil 46 into the slot 42 of the stator core 27 in the manufacturing step of the stator 22, the insulating paper 52 abuts the jig 68 and movement of the insulating paper 52 is restricted, thereby suppressing displacement of the insulating paper 52 from the slot 42. Further, the one end 56a and the other end 56b of the insulating paper 52 are disposed at positions different from the positions facing the opening 54 of the slot 42, specifically, at the positions in the third portion 52c on the radially outer side of the stator core 27. Therefore, the protrusion 58 is provided without being fragmented, and a rigidity of the protrusion 58 is ensured. As a result, when the insulating paper 52 comes into contact with the jig 68 in the process of inserting the segment coil 46 into the slot 42 (during a transitional period), deformation (for example, buckling) of the protrusion 58 is suppressed.

Figure 6:
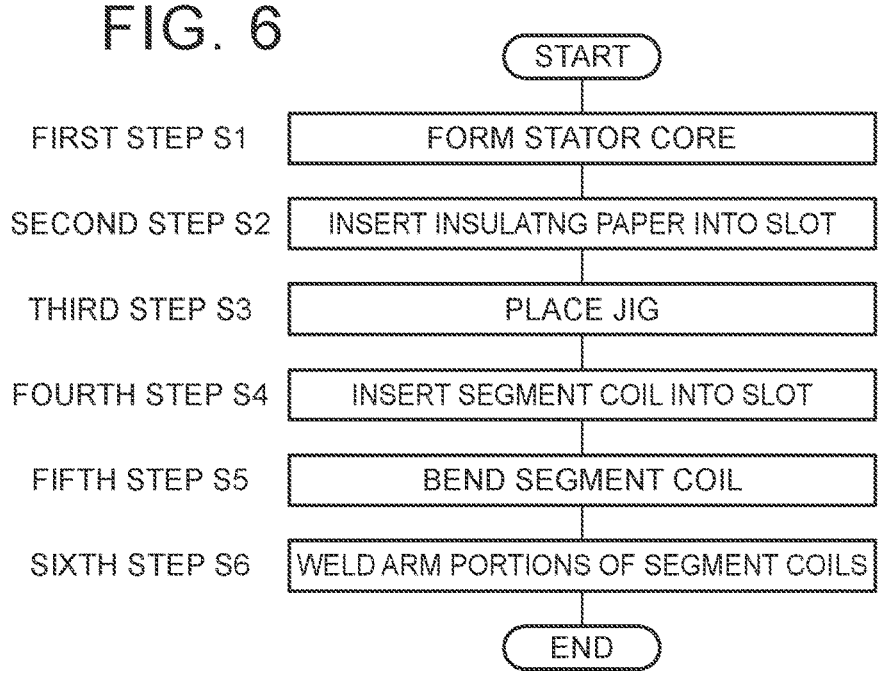
FIG. 6 is a flowchart illustrating manufacturing steps of the stator shown in FIG. 1.

FIG. 6 is a flowchart illustrating the manufacturing step (manufacturing method) of the stator 22. The stator 22 is manufactured in order of a first step S1 to a sixth step S6 shown in FIG. 6.

In the first step S1 shown in FIG. 6, the stator core 27 is configured by laminating the electromagnetic steel plates 23. In the second step S2, the insulating paper 52 that is folded in advance into a shape that can be inserted into the slot 42 is inserted into each slot 42 of the stator core 27. The protrusion 58 is also formed in the step of bending the insulating paper 52 into a shape that matches the shape of the slot 42. In the third step S3, the jig 68 is placed at a predetermined position prior to the insertion of the segment coil 46. The predetermined position is a position as described above on the side opposite to the side from which the segment coil 46 is inserted into the slot 42 of the stator core 27 and a position where a part of the jig 68 overlaps with the protrusion 58 when the jig 68 is viewed from the inserting direction of the segment coil 46.

In the fourth step S4, the segment coil 46 is inserted into each slot 42 of the stator core 27. In this step, even when the insulating paper 52 is dragged by the segment coil 46, the insulating paper 52 abuts the jig 68 and the movement of the insulating paper 52 is restricted. Therefore, displacement of the insulating paper 52 from the slot 42 is suppressed. In the fifth step S5, when the segment coil 46 is inserted into each slot 42, bending processing is performed to bend one end of each of the arm portions 46a, 46b of the segment coil 46 in the circumferential direction of the stator core 27. In the sixth step S6, the tips ends of the arm portions 46a, 46b of the segment coils 46 bent in the fifth step S5 are joined to each other by welding.

As described above, according to the embodiment, the step of inserting the insulating paper 52 into the slot 42 of the stator core 27 (the second step S2) is performed, the step of placing the jig 68 at the position that is on the side opposite to the side from which the segment coil 46 is inserted into the slot 42 of the stator core 27 and that overlaps with the protrusion 58 when viewed in the inserting direction of the segment coil 46 (the third step S3) is performed, and then the step of inserting the segment coil 46 into the slot 42 (the fourth step S4) is performed. Therefore, even when the insulating paper 52 is dragged by the segment coil 46 in the process of inserting the segment coil 46 into the slot 42, the insulating paper 52 abuts the jig 68 and the movement of the insulating paper 52 is restricted, thereby suppressing displacement of the insulating paper 52 from the slot 42. Here, a stopper groove portion to suppress displacement of the insulating paper 52 does not need to be provided in the slot 42. Therefore, reduction of the number of the segment coils 46 housed in the slot 42 is also suppressed.

Further, according to the embodiment, the one end 56a and the other end 56b of the insulating paper 52 surrounding the segment coil 46 are disposed in the third portion 52c that is a position different from the radially inner side of the segment coil 46. Therefore, the rigidity of the protrusion 58 provided for the insulating paper 52 is secured. Therefore, when the protrusion 58 comes into contact with the jig 68 in the process of inserting the segment coil 46 into the slot 42, deformation of the protrusion 58 caused by the jig 68 can be suppressed. Further, the space 64 is provided between the protrusion 58 and the segment coil 46, and the oil flows into the space 64 provided between the protrusion 58 and the segment coil 46. This improves cooling performance for the stator core 27 and the stator coil 28 (the segment coils 46). In connection with this, a radiant heat from the stator coil 28 to the rotor 20 is also reduced, which reduces the temperature of the magnet 36 built in the rotor core 24. As a result, the heat resistance of the magnet 36 and the segment coil 46 can be relaxed. Therefore, the magnet 36 and the segment coil 46 can be manufactured with a cheaper material than before.

Next, a second embodiment of the present disclosure will be described. In the following description, the same parts as those in the embodiment described above will be designated by the same reference signs and the description thereof will be omitted.

Figure 7:
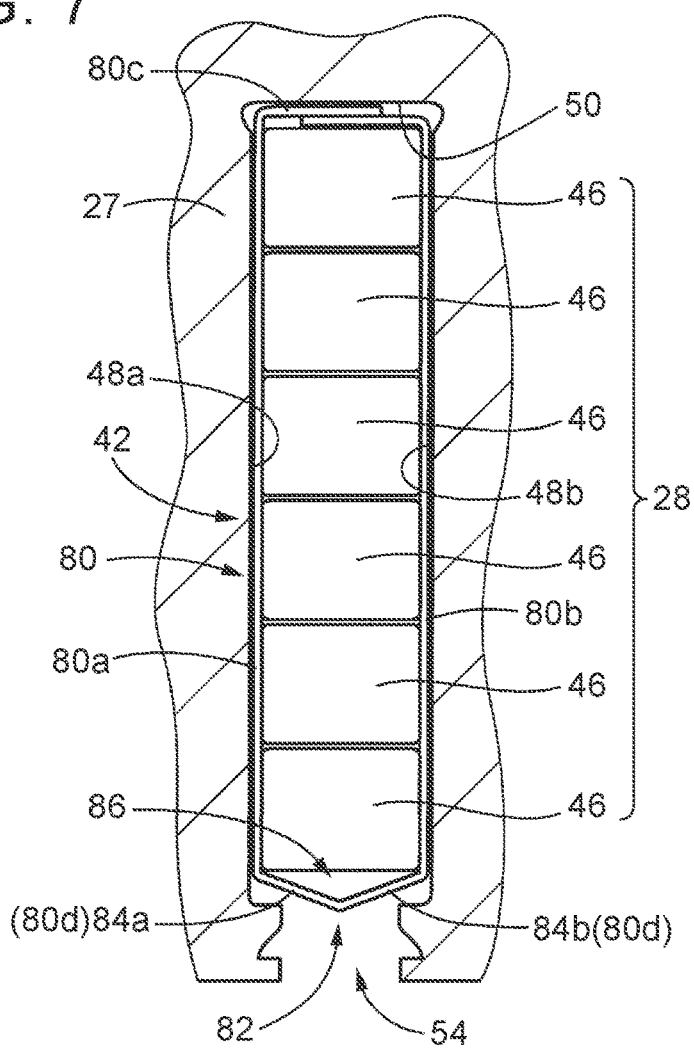
FIG. 7 is an enlarged sectional view of a periphery of the slot provided in the stator core, which corresponds to a second embodiment of the present disclosure.

FIG. 7 is an enlarged sectional view of the periphery of the slot 42 provided in the stator core 27, which corresponds to the second embodiment of the present disclosure. FIG. 7 corresponds to FIG. 3 according to the first embodiment above. The shapes of the stator core 27 and the slot 42 are the same as those in the first embodiment. Therefore, the stator core 27 and the slot 42 are denoted by the same reference numerals, and the description thereof will be omitted.

As shown in FIG. 7, an insulating paper 80 is interposed between the walls (48a, 48b, 50) constituting the slot 42 of the stator core 27 and the plurality of segment coils 46 housed in the slot 42. The insulating paper 80 is appropriately bent such that the insulating paper 80 is disposed so as to surround the segment coils 46 housed in the slot 42 when viewed from the inserting direction of the segment coils 46.

The insulating paper 80 is configured of a first portion 80a, a second portion 80b, a third portion 80c, and a fourth portion 80d. The first portion 80a is interposed between the side wall 48a of the slot 42 and the segment coils 46. The second portion 80b is interposed between the side wall 48b of the slot 42 and the segment coils 46. The third portion 80c is interposed between the bottom wall 50 of the slot 42 and the segment coil 46. The fourth portion 80d is located on the radially inner side of the stator core 27.

Further, the fourth portion 80d located on the radially inner side of the stator core 27 in the insulating paper 80, that is, located on the opening 54 side in the slot 42 includes a protrusion 82 that protrudes toward the inner peripheral side of the stator core 27. The protrusion 82 has a protruding shape that protrudes toward the inner peripheral side of the stator core 27.

When the protrusion 82 is viewed in the inserting direction of the segment coils 46, the protrusion 82 has a triangle section. Specifically, the protrusion 82 is composed of a pair of inclined portions 84a, 84b having a predetermined gradient with respect to the long side of the segment coil 46. The section of the protrusion 82 has a triangle shape as a tip end of the inclined portion 84a is continuously connected to a tip end of the inclined portion 84b. Further, with the configuration in which the protrusion 82 protrudes toward the inner peripheral side of the stator core 27, a space 86 surrounded by the protrusion 82 and the long side of the segment coil 46 is provided.

Even with the protrusion 82 configured as described above, when the segment coil 46 is inserted into the slot 42 of the stator core 27, the jig 68 (see FIG. 5) is placed at the same position as in the first embodiment and the jig 68 abuts the protrusion 82. This suppresses displacement of the insulating paper 80 from the slot 42 even when the insulating paper 80 is dragged by the segment coil 46. As the oil flows in the space 86, the stator core 27 and the stator coil 28 are effectively cooled by the oil flowing in the space 86. Therefore, the same effect as that of the first embodiment can be obtained in the second embodiment as well.

Figure 8:
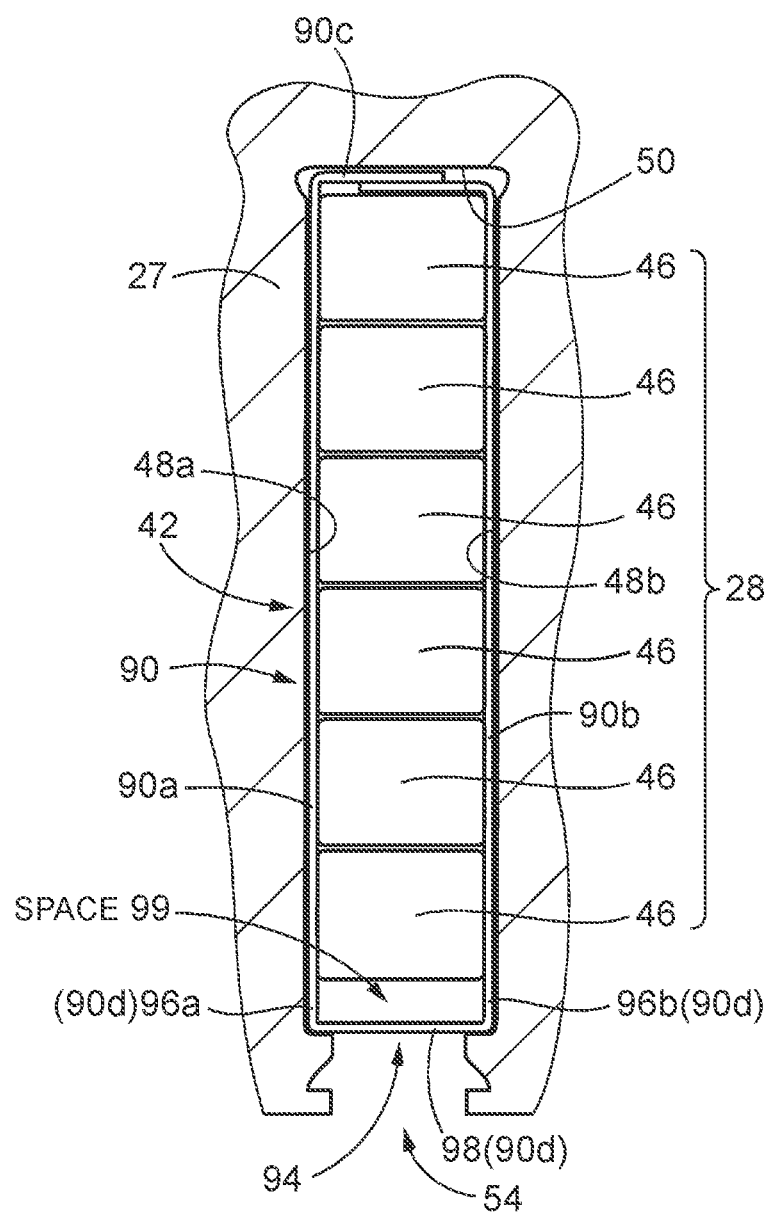
FIG. 8 is an enlarged sectional view of the periphery of the slot provided in the stator core, which corresponds to a third embodiment of the present disclosure.

FIG. 8 is an enlarged sectional view of the periphery of the slot 42 provided in the stator core 27, which corresponds to a third embodiment of the present disclosure. FIG. 8 corresponds to FIG. 3 according to the first embodiment above. The shapes of the stator core 27 and the slot 42 are the same as those in the first embodiment. Therefore, the stator core 27 and the slot 42 are denoted by the same reference numerals, and the description thereof will be omitted.

As shown in FIG. 8, an insulating paper 90 is interposed between the walls constituting the slot 42 of the stator core 27 and the plurality of segment coils 46 housed in the slot 42. The insulating paper 90 is appropriately bent such that the insulating paper 90 is disposed so as to surround the segment coils 46 housed in the slot 42 when viewed from the inserting direction of the segment coils 46.

The insulating paper 90 is configured of a first portion 90a, a second portion 90b, a third portion 90c, and a fourth portion 90d. The first portion 90a is interposed between the side wall 48a of the slot 42 and the segment coils 46. The second portion 90b is interposed between the side wall 48b of the slot 42 and the segment coils 46. The third portion 90c is interposed between the bottom wall 50 of the slot 42 and the segment coil 46. The fourth portion 90d is located on the radially inner side of the stator core 27.

Further, the fourth portion 90d located on the radially inner side of the stator core 27 in the insulating paper 90, that is, located on the opening 54 side in the slot 42, includes a protrusion 94 that protrudes toward the inner peripheral side of the stator core 27. The protrusion 94 has a protruding shape that protrudes toward the inner peripheral side of the stator core 27.

When the protrusion 94 is viewed in the inserting direction of the segment coil 46, the insulating paper 90 has a U shape protruding toward the inner peripheral side of the stator core 27 from the segment coil 46. Specifically, the protrusion 94 includes a pair of extension portions 96a, 96b extending from the ends of the first portion 90a and the second portion 90b toward the inner peripheral side of the segment coil 46, and a connecting portion 98 that connects tip ends of the extension portions 96a, 96b. Further, with the configuration in which the extension portions 96a, 96b extend toward the inner peripheral side of the stator core 27 from the segment coil 46, a space 99 surrounded by the protrusion 94 and the long side of the segment coil 46 is provided.

Even with the protrusion 94 configured as described above, when the segment coil 46 is inserted into the slot 42 of the stator core 27, the jig 68 (see FIG. 5) is placed at the same position as in the first embodiment and the jig 68 abuts the protrusion 94. This suppresses displacement of the insulating paper 90 from the slot 42 even when the insulating paper 90 is dragged by the segment coil 46. As the oil flows in the space 99, the stator core 27 and the stator coil 28 are effectively cooled by the oil flowing in the space 99.

Therefore, the same effect as that of the embodiments above can be obtained in the third embodiment as well.

Figure 9:
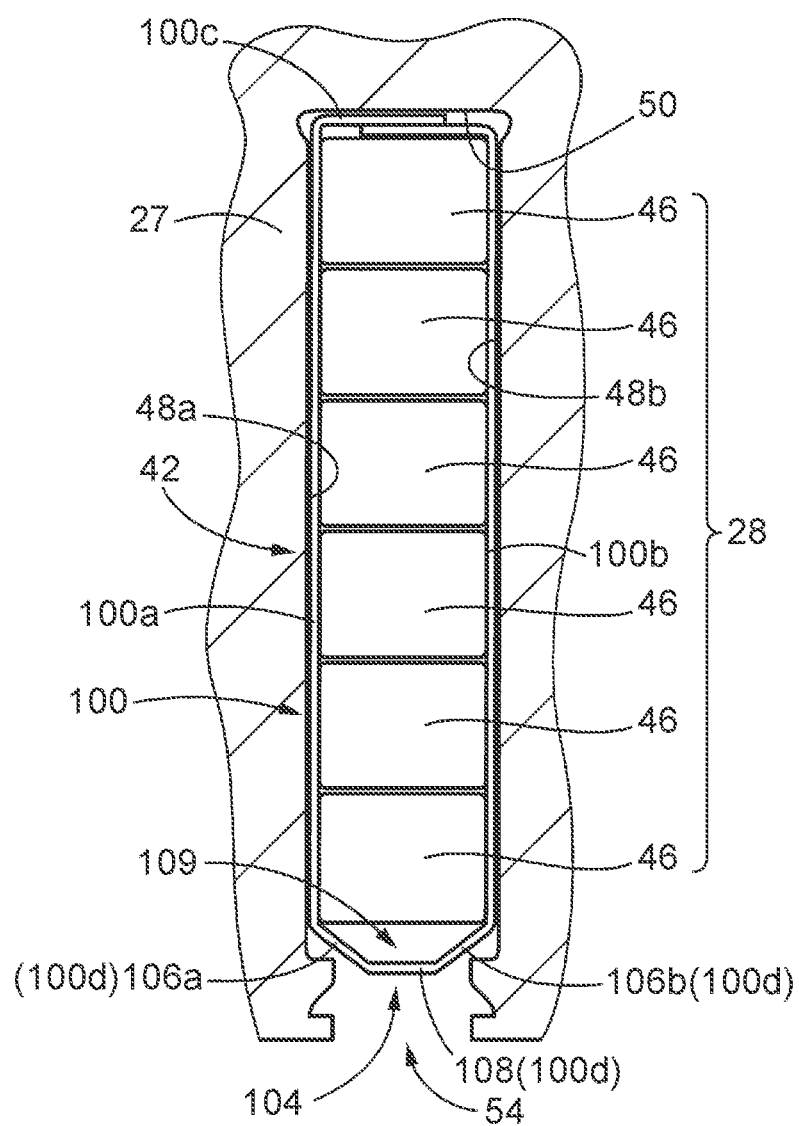
FIG. 9 is an enlarged sectional view of the periphery of the slot provided in the stator core, which corresponds to a fourth embodiment of the present disclosure.

FIG. 9 is an enlarged sectional view of the periphery of the slot 42 provided in the stator core 27, which corresponds to a fourth embodiment of the present disclosure. FIG. 9 corresponds to FIG. 3 according to the first embodiment above. The shapes of the stator core 27 and the slot 42 are the same as those in the first embodiment. Therefore, the stator core 27 and the slot 42 are denoted by the same reference numerals, and the description thereof will be omitted.

As shown in FIG. 9, an insulating paper 100 is interposed between the walls constituting the slot 42 of the stator core 27 and the plurality of segment coils 46 housed in the slot 42. The insulating paper 100 is appropriately bent such that the insulating paper 100 is disposed so as to surround the segment coils 46 housed in the slot 42 when viewed in the inserting direction of the segment coils 46.

The insulating paper 100 is configured of a first portion 100a, a second portion 100b, a third portion 100c, and a fourth portion 100d. The first portion 100a is interposed between the side wall 48a of the slot 42 and the segment coils 46. The second portion 100b is interposed between the side wall 48b of the slot 42 and the segment coils 46. The third portion 100c is interposed between the bottom wall 50 of the slot 42 and the segment coil 46. The fourth portion 100d is located on the radially inner side of the stator core 27.

Further, the fourth portion 100d located on the radially inner side of the stator core 27 in the insulating paper 100, that is, located on the opening 54 side in the slot 42, includes a protrusion 104 that protrudes toward the inner peripheral side of the stator core 27. The protrusion 104 has a protruding shape that protrudes toward the inner peripheral side of the stator core 27.

When the protrusion 104 is viewed in the inserting direction of the segment coils 46, the protrusion 104 has a trapezoidal section. Specifically, the protrusion 104 connects a pair of inclined portions 106a, 106b that incline from ends of the first portion 100a and the second portion 100b with a predetermined gradient and a connecting portion 108 that connects tip ends of the inclined portions 106a, 106b. Further, with the configuration in which the protrusion 104 protrudes toward the inner peripheral side of the stator core 27, a space 109 surrounded by the protrusion 104 and the long side of the segment coil 46 is provided.

Even with the protrusion 104 as described above, when the segment coil 46 is inserted into the slot 42 of the stator core 27, the jig 68 (see FIG. 5) is placed at the same position as in the first embodiment and the jig 68 abuts the protrusion 104. This suppresses displacement of the insulating paper 100 from the slot 42 even when the insulating paper 100 is dragged by the segment coil 46. As the oil flows in the space 109, the stator core 27 and the stator coil 28 are effectively cooled by the oil flowing in the space 109. Therefore, the same effect as that of the first embodiment can be obtained in the fourth embodiment as well.

Figure 10:
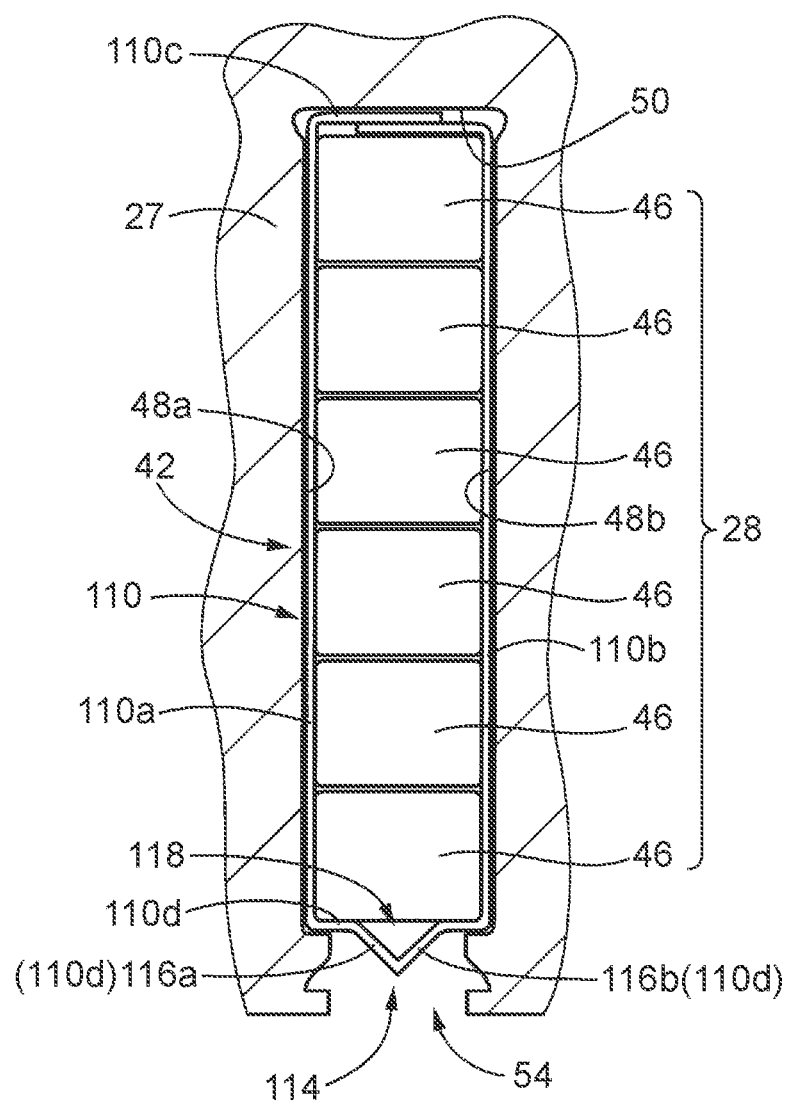
FIG. 10 is an enlarged sectional view of the periphery of the slot provided in the stator core, which corresponds to a fifth embodiment of the present disclosure.

FIG. 10 is an enlarged sectional view of the periphery of the slot 42 provided in the stator core 27, which corresponds to a fifth embodiment of the present disclosure. FIG. 10 corresponds to FIG. 3 according to the first embodiment above. The shapes of the stator core 27 and the slot 42 are the same as those in the first embodiment. Therefore, the stator core 27 and the slot 42 are denoted by the same reference numerals, and the description thereof will be omitted.

As shown in FIG. 10, an insulating paper 110 is interposed between the walls constituting the slot 42 of the stator core 27 and the plurality of segment coils 46 housed in the slot 42. The insulating paper 110 is appropriately bent such that the insulating paper 110 is disposed so as to surround the segment coils 46 housed in the slot 42 when viewed in the inserting direction of the segment coils 46.

The insulating paper 110 is configured of a first portion 110a, a second portion 110b, a third portion 110c, and a fourth portion 110d. The first portion 110a is interposed between the side wall 48a of the slot 42 and the segment coils 46. The second portion 110b is interposed between the side wall 48b of the slot 42 and the segment coils 46. The third portion 110c is interposed between the bottom wall 50 of the slot 42 and the segment coil 46. The fourth portion 110d is located on the radially inner side of the stator core 27.

Further, the fourth portion 110d located on the radially inner side of the stator core 27 in the insulating paper 110, that is, located on the opening 54 side in the slot 42, includes a protrusion 114 that protrudes toward the inner peripheral side of the stator core 27. The protrusion 114 has a protruding shape that protrudes toward the inner peripheral side of the stator core 27.

When the protrusion 114 is viewed in the inserting direction of the segment coils 46, the protrusion 114 has a triangle section. The protrusion 114 is composed of a pair of inclined portions 116a, 116b that are inclined with a predetermined gradient. The protrusion 114 is formed by bending a part of the fourth portion 110d constituting the insulating paper 110 to have a triangular section. As described above, the protrusion 114 may be provided on a part of the fourth portion 110d. Further, with the configuration in which the protrusion 114 protrudes toward the inner peripheral side of the stator core 27, a space 118 surrounded by the protrusion 114 and the long side of the segment coil 46 is provided.

Even with the protrusion 114 configured as described above, when the segment coil 46 is inserted into the slot 42 of the stator core 27, the jig 68 (see FIG. 5) is placed at the same position as in the first embodiment and the jig 68 abuts the protrusion 114. This suppresses displacement of the insulating paper 110 from the slot 42 even when the insulating paper 110 is dragged by the segment coil 46. As the oil flows in the space 118, the stator core 27 and the stator coil 28 are effectively cooled by the oil flowing in the space 118. Therefore, the same effect as that of the embodiments can be obtained in the fifth embodiment as well.

Figure 11:
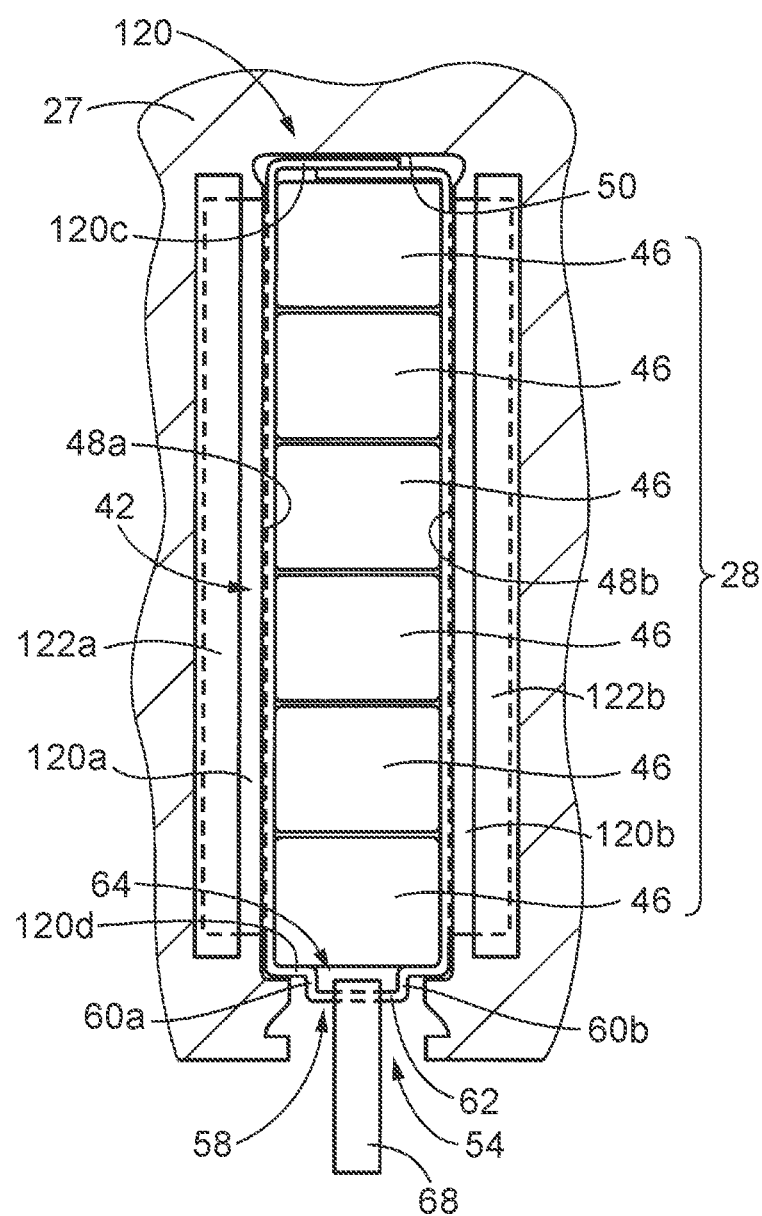
FIG. 11 is a diagram viewed from the side opposite to the side from which the segment coil is inserted into the stator core in the process of inserting the arm portions of the segment coil into the slot of the stator core, which corresponds to a sixth embodiment of the present disclosure.

FIG. 11 is a diagram viewed from the side opposite to the side from which the segment coil 46 is inserted into the stator core 27 in the process of inserting the arm portions 46a, 46b of the segment coil 46 into the slot 42 of the stator core 27, which corresponds to a sixth embodiment of the present disclosure. FIG. 11 corresponds to FIG. 5 according to the first embodiment above. The shapes of the stator core 27 and the slot 42 are the same as those in the first embodiment. Therefore, the stator core 27 and the slot 42 are denoted by the same reference numerals, and the description thereof will be omitted.

As shown in FIG. 11, an insulating paper 120 is interposed between the walls constituting the slot 42 of the stator core 27 and the plurality of segment coils 46 housed in the slot 42. The insulating paper 120 is appropriately bent such that the insulating paper 120 is disposed so as to surround the segment coils 46 housed in the slot 42 when viewed in the inserting direction of the segment coils 46.

The insulating paper 120 is configured of a first portion 120a, a second portion 120b, a third portion 120c, and a fourth portion 120*d*. The first portion 120*a* is interposed between the side wall 48*a* of the slot 42 and the segment coils 46. The second portion 120*b* is interposed between the side wall 48*b* of the slot 42 and the segment coils 46. The third portion 120*c* is interposed between the bottom wall 50 of the slot 42 and the segment coil 46. The fourth portion 120*d* is located on the radially inner side of the stator core 27.

Figure 12:
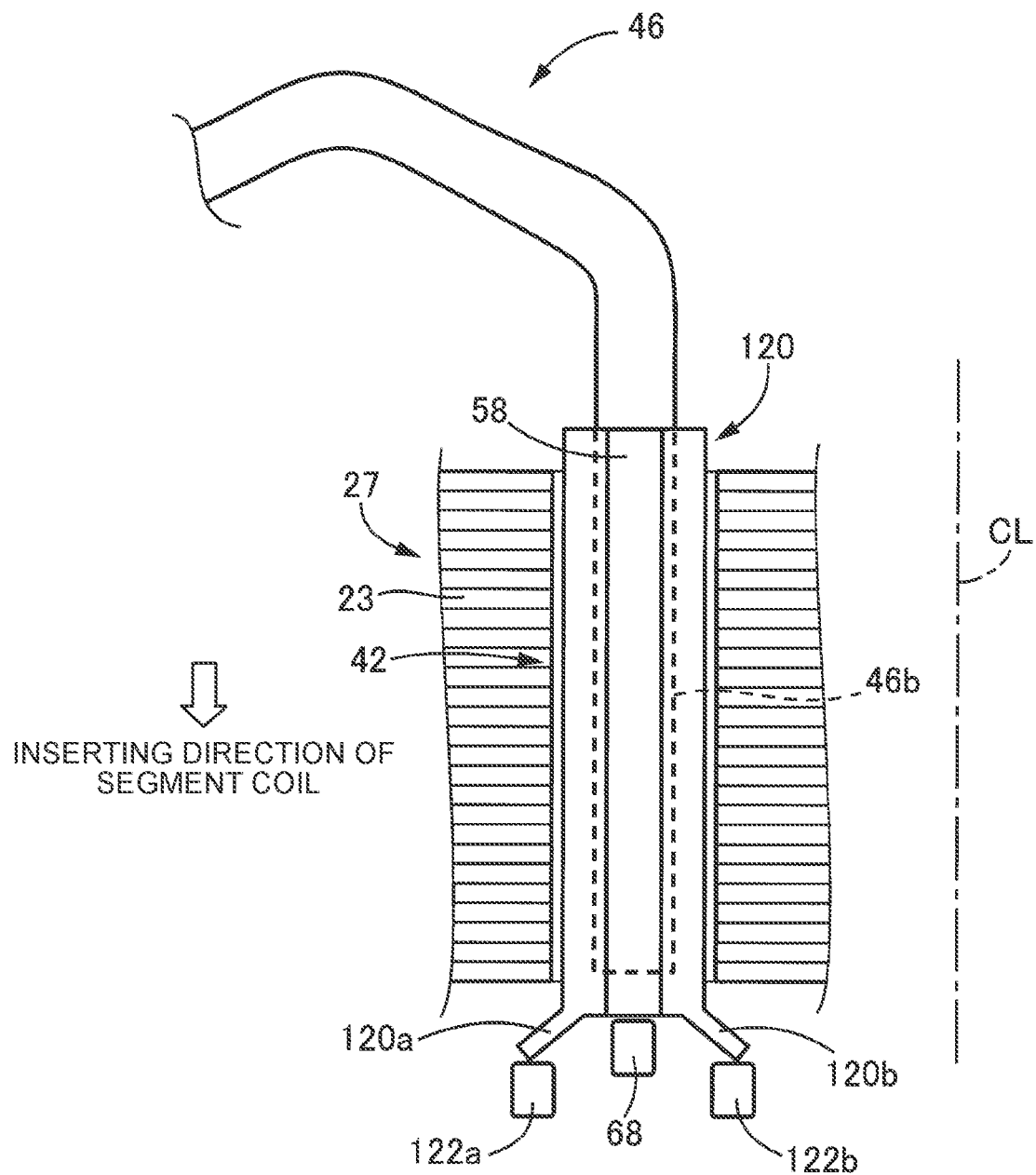
FIG. 12 is a view of a transitional state shown in FIG. 11 in which a segment coil is inserted into a slot of a stator core as viewed from the radially inner side toward the radially outer side of the stator core.

In the first portion 120*a*, a portion protruding from the stator core 27 in the direction of the axis CL is bent in a tapered shape (see FIG. 12). Similarly, in the second portion 120*b*, a portion protruding from the stator core 27 in the direction of the axis CL is bent in a tapered shape (see FIG. 12). The tapered portion of the first portion 120*a* and the tapered portion of the second portion 120*b* are bent in a direction away from each other. Therefore, when the first portion 120*a* and the second portion 120*b* are viewed in the direction of the axis CL of the stator core 27, neither the first portion 120*a* nor the second portion 120*b* overlaps the segment coil 46.

In the sixth embodiment as well, similar to the first embodiment described above, the protrusion 58 that protrudes toward the inner peripheral side of the stator core 27 is provided in the fourth portion 120*d* located on the opening 54 side (on the radially inner side) of the stator core 27 in the insulating paper 120. Further, the jig 68 is placed at a position that is on the side opposite to the side from which the segment coil 46 is inserted into the slot 42 of the stator core 27 and that overlaps with the protrusion 58 when the stator core 27 is viewed in the inserting direction of the segment coil 46. Therefore, even when the insulating paper 120 is dragged by the segment coil 46 in the process of inserting the segment coil 46 into the slot 42 of the stator core 27, the protrusion 58 abuts the jig 68, thereby suppressing displacement of the insulating paper 120 from the slot 42. Therefore, the same effect as that of the first embodiment described above can be obtained.

Further, in the sixth embodiment, a first taper abutting jig 122*a* (hereinafter referred to as a first jig 122*a*) is placed at a position that is on the side opposite to the side from which the segment coil 46 is inserted to the slot 42 of the stator core 27 and that overlaps with the tapered portion of the first portion 120*a* of the insulating paper 120 when viewed in the inserting direction of the segment coil 46 into the stator core 27, in addition to the above configuration. Further, a second taper abutting jig 122*b* (hereinafter referred to as a second jig 122*b*) is placed at a position that is on the side opposite to the side from which the segment coil 46 is inserted to the slot 42 of the stator core 27 and that overlaps with the tapered portion of the second portion 120*b* of the insulating paper 120 when viewed in the inserting direction of the segment coil 46 into the stator core 27.

As shown in FIG. 11, the first jig 122*a* is placed at a position where the first jig 122*a* abuts the tapered portion of the first portion 120*a* when the insulating paper 120 moves in the inserting direction of the segment coil 46 (the lower side in FIG. 11). That is, when the stator core 27 is viewed from the side opposite to the side from which the segment coil 46 is inserted, the first jig 122*a* is placed at a position that overlaps with the tapered portion of the first portion 120*a*. Similarly, the second jig 122*b* is placed at a position where the second jig 122*b* abuts the tapered portion of the second portion 120*b* when the insulating paper 120 moves in the inserting direction of the segment coil 46. That is, when the stator core 27 is viewed from the side opposite to the side from which the segment coil 46 is inserted, the second jig 122*b* is placed at a position that overlaps with the tapered portion of the second portion 120*b*.

FIG. 12 is a diagram showing a simplified view of a state in which FIG. 11 is viewed from the radially inner side toward the radially outer side of the stator core 27.

As can be seen from FIG. 12, in the process of inserting the segment coil 46 into the slot 42 of the stator core 27, the jig 68, the first jig 122*a*, and the second jig 122*b* are placed on the side opposite (the lower side in the drawing) to the side from which the segment coil 46 is inserted into the slot 42 in the direction of the axis CL of the stator core 27. Further, the jig 68 is placed at a position where the jig 68 abuts the protrusion 58 when the insulating paper 120 moves in the inserting direction (the lower side in the drawing) of the segment coil 46. Similarly, the first jig 122*a* is placed at a position where the first jig 122*a* abuts the tapered portion of the first portion 120*a* when the insulating paper 120 moves in the inserting direction of the segment coil 46. Similarly, the second jig 122*b* is placed at a position where the second jig 122*b* abuts the tapered portion of the second portion 120*b* when the insulating paper 120 moves in the inserting direction of the segment coil 46.

Therefore, when the insulating paper 120 is dragged by the segment coil 46 in the process of inserting the segment coil 46 into the slot 42 of the stator core 27, the insulating paper 120 abuts each of the jig 68, the first jig 122*a*, and the second jig 122*b*, thereby preferably suppressing displacement of the insulating paper 120 from the slot 42.

As described above, a portion having a tapered shape is added to the insulating paper 120 according to the sixth embodiment, and further, the first jig 122*a* and the second jig 122*b* are placed such that the first jig 122*a* and the second jig 122*b* can abut the tapered portion of the insulating paper 120 in the process of inserting the segment coil 46 into the slot 42. With this configuration, the insulating paper 120 abuts the first jig 122*a* and the second jig 122*b* in addition to the jig 68 in the process of inserting the segment coil 46 into the slot 42 of the stator core 27, thereby further suppressing displacement of the insulating paper 120 from the slot 42.

Note that, the insulating paper 120 includes the tapered portion protruding from the stator core 27. Therefore, the portion of the insulating paper 120 protruding from the stator core 27 becomes long along the axis CL at a portion of the stator coil 28 protruding from the stator core 27. On the other hand, in the first to fifth embodiments above, the insulating paper does not have a tapered portion. Therefore, the insulating paper hardly protrudes from the stator core 27. In connection with this, the length of the portion (coil end) of the stator coil 28 protruding from the stator core 27 can be shortened.

Although the embodiments of the present disclosure have been described in detail with reference to the drawings, the present disclosure is also applicable to other modes.

For example, the first jig 122*a* and the second jig 122*b* described in the sixth embodiment may be added to each of the first to fifth embodiments above, as appropriate.

Further, the protrusions (58, 82, 94, 104, 114) of the embodiments above are one mode and do not necessarily have the shapes above. That is, the protrusion may be applied as appropriate as long as the protrusion has a shape with which the protrusion can abut the jig 68 by protruding toward the inner peripheral side of the stator core 27 in the process of inserting the segment coil 46 into the slot 42 (insertion transition period).

Further, in the embodiments above, the one end 56*a* and the other end 56*b* of the insulating paper (52, 80, 90, 100, 110, 120) are disposed at positions in the third portion (52*c*, 80*c*, 90*c*, 100*c*, 110*c*, 120*c*) interposed between the bottom wall 50 and the segment coil 46. However, a applicable embodiment of the present disclosure is not limited to this. Specifically, one end and the other end of the insulating paper may be located at the position of the first portion interposed between the side wall 48*a* and the segment coil 46 or at the position of the second portion interposed between the side wall 48*b* and the segment coil 46. As described above, when the one end and the other end of the insulating paper are disposed in a portion different from the fourth portion of the insulating paper located on the radially inner side of the stator core 27, the rigidity of the protrusion provided for the insulating paper is preferably secured.

Further, in the embodiments above, six segment coils 46 are housed in each slot 42. However, the number of segment coils 46 is not necessarily limited to six and can be changed as appropriate.

The above description is merely an example, and the present disclosure can be implemented in various modified and improved modes based on the knowledge of those skilled in the art.

What is claimed is:

1. A manufacturing method of a stator for a vehicle rotary electric machine, the stator including an annular stator core, a slot that is a groove hole provided in an inner peripheral portion of the stator core and penetrates the stator core, and an insulating paper that is interposed between a wall surface of the slot and a lead wire housed in the slot and is disposed to surround the lead wire, a protrusion protruding toward an inner peripheral side of the stator core being provided for the insulating paper on a radially inner side of the stator core, the manufacturing method comprising:

inserting the insulating paper into the slot of the stator core;

placing a jig at a position that is on a side opposite to a side from which the lead wire is inserted into the slot of the stator core and that overlaps with the protrusion when viewed in an inserting direction of the lead wire into the slot of the stator core, the inserting direction of the lead wire being parallel to an axis of the stator core; and inserting the lead wire into the slot, wherein one end and the other end of the insulating paper surrounding the lead wire are disposed at positions different from a position of the protrusion formed on the insulating paper.

2. The manufacturing method of the stator for the vehicle rotary electric machine according to claim 1, wherein a space surrounded by the protrusion and the lead wire is provided between the protrusion and the lead wire.

* * * * *